Dec. 9, 1952  E. C. BOOTH  2,620,720
AUTOMOBILE BODY HEATER
Filed Feb. 21, 1949  2 SHEETS—SHEET 1
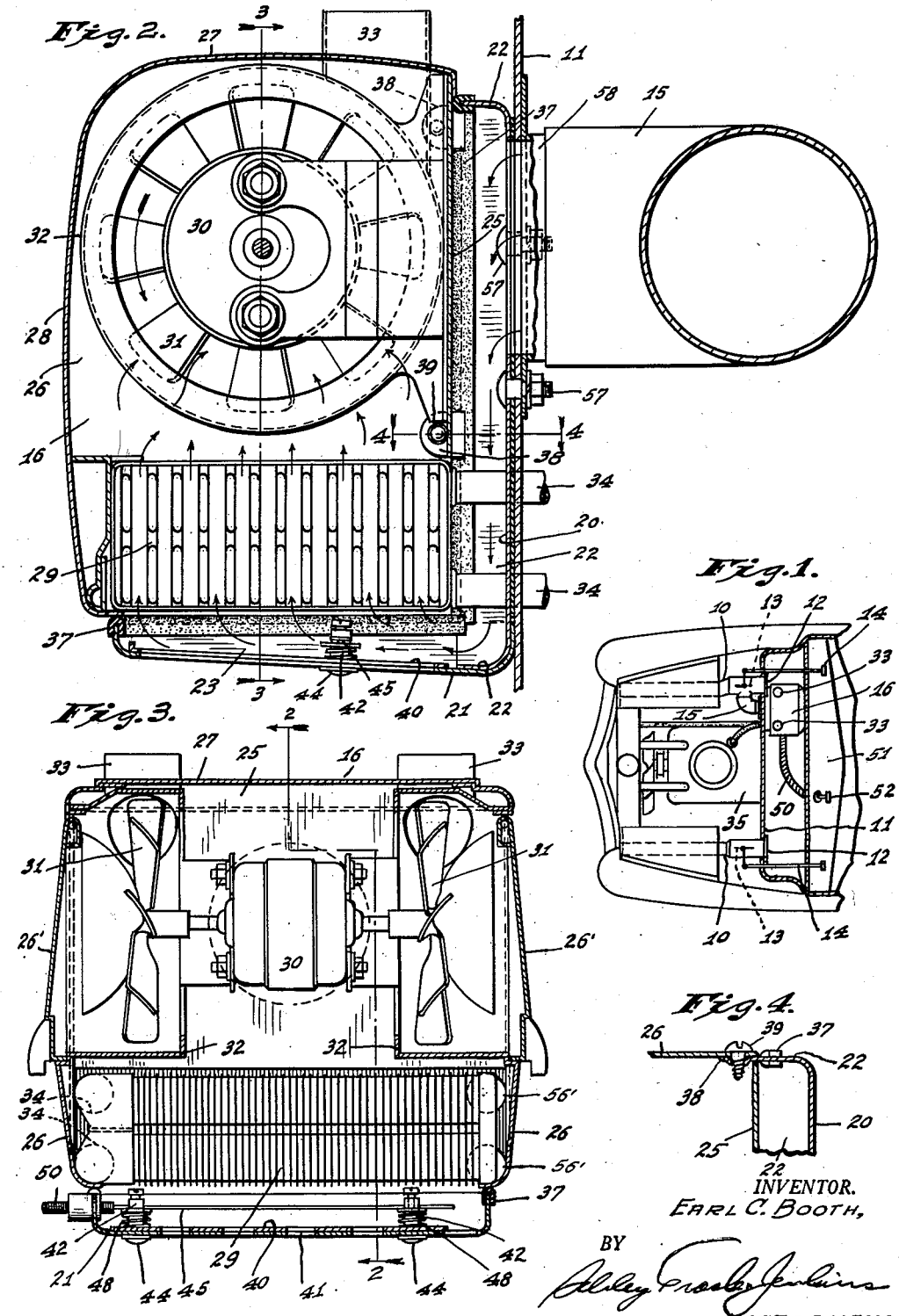
INVENTOR.
EARL C. BOOTH,
BY
ATTORNEYS.

Dec. 9, 1952 E. C. BOOTH 2,620,720
AUTOMOBILE BODY HEATER
Filed Feb. 21, 1949 2 SHEETS—SHEET 2
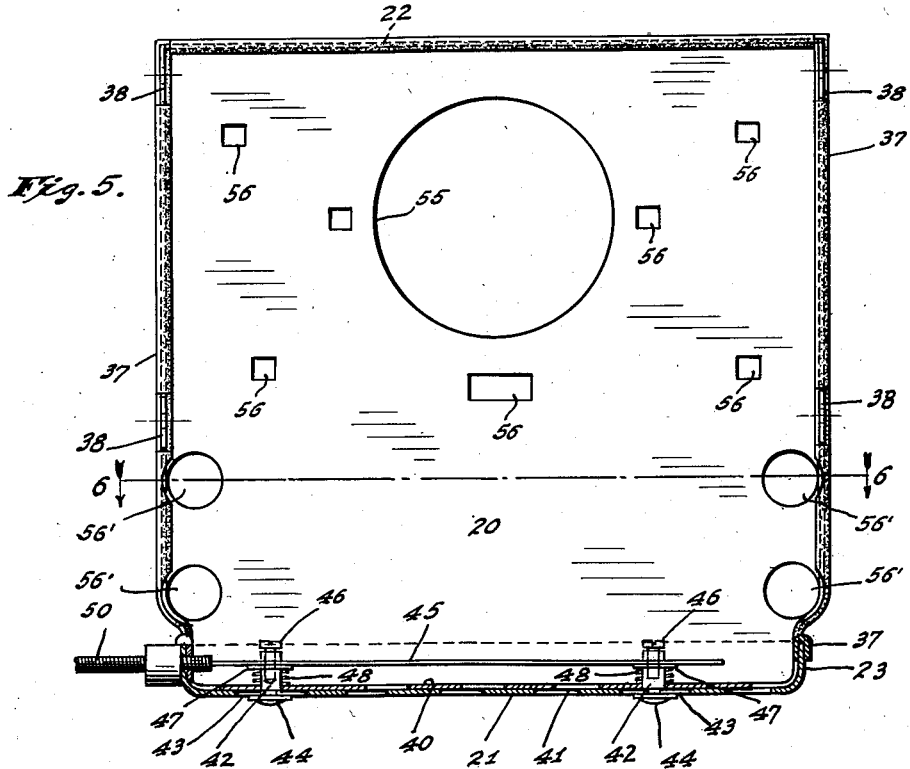
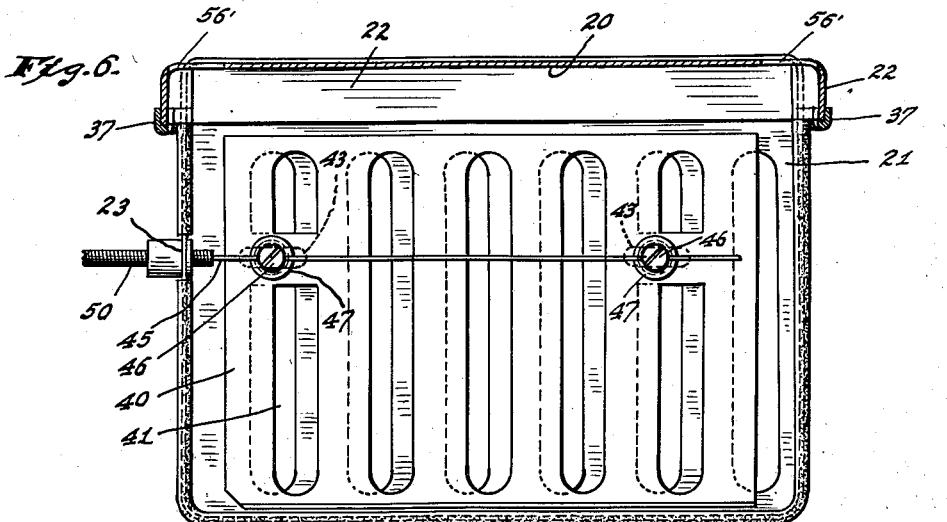
INVENTOR.
EARL C. BOOTH
BY
ATTORNEYS.

Patented Dec. 9, 1952

2,620,720

UNITED STATES PATENT OFFICE 2,620,720

AUTOMOBILE BODY HEATER

Earl C. Booth, Columbus, Ind., assignor to Arvin Industries, Inc., a corporation of Indiana Application February 21, 1949, Serial No. 77,476

7 Claims. (Cl. 98—2)

This invention relates to automobile-body heaters of the circulating fluid type and more particularly to the provision of means whereby a more or less standard form of heater can be adapted for use alternatively as a circulating heater, to circulate and warm the air within an automobile body, or as a fresh-air heater, to heat air admitted to the automobile body from the outside atmosphere.

Many automobiles as now manufactured are provided with fresh-air admitting means comprising a conduit having a forwardly directed inlet end and an outlet end extending through the automobile dash. To provide for the possibility of heating air admitted to the automobile body from outside, it is a common practice to form the rear end of the conduit as a T having a lateral adapted to be connected through an elbow to the inlet of a heater mounted on the inner side of the automobile dash. As a heater may not be desired by all users, the lateral is ordinarily capped, and the opening in the dash through which fresh air would be admitted to the heater is ordinarily closed with a knock-out. Further, it is common practice to provide the aforesaid T with a butterfly valve by means of which the flow of fresh air through the conduit may be stopped entirely, directed entirely to the lateral, or permitted to continue rearwardly through the run of the T.

The manufacturer of an automobile as above described contemplates that if a heater is to be used it will be of a type designed for the particular automobile and especially adapted to receive fresh air through an elbow connected to the lateral of the T in the fresh-air conduit. Many standard forms of automobile heater on the market are designed and adapted only to circulate the air within the automobile body, and are not adapted to receive and heat directly air admitted to the automobile body through an opening in the dash.

It is an object of this invention to provide means whereby an automobile-body heater of the circulating type can be adapted to heat directly air admitted through the dash or compartment wall on which the heater is mounted. A further object of the invention is to produce such a means which will not interfere with use of the heater as a circulating heater when such a use is desired. Still another object of the invention is to reduce the cost of automobile-body heaters adapted to the heating of fresh air by making it possible to employ as a component part thereof a heater primarily adapted for recirculation operation.

In carrying out the invention, I employ a heater which has an inlet opening at its bottom and includes a heat-exchanging core together with means for drawing air inwardly through the inlet opening, causing it to pass through the core, and discharging it through one or more outlet openings. To adapt such a heater for use as a fresh-air heater, I employ a generally L-shaped bracket having a vertical leg adapted to be secured to the dash of the automobile body and a horizontal leg projecting forwardly from the vertical leg. In cross-section, both bracket-legs are channel-like so that air admitted into the vertical leg can flow downwardly to the horizontal leg and through the latter to the inlet opening of a heater mounted on the bracket. The lower leg of the bracket is provided with an opening and associated damper mechanism adjustable either to close or open the opening. The vertical leg of the bracket has an air-admitting opening, which, when the bracket is mounted on the dash of an automobile body, is aligned with the fresh-air opening therein.

The accompanying drawings illustrate the invention: Fig. 1 is a fragmental plan view, somewhat diagrammatic in character, illustrating a conventional form of automobile provided with fresh-air admitting conduits; Fig. 2 is a vertical section through a heater and its mounting on the line 2—2 of Fig. 3; Fig. 3 is a vertical section on the line 3—3 of Fig. 2; Fig. 4 is a fragmental section illustrating details of the manner in which the heater may be secured to the mounting bracket; Fig. 5 is a view similar to Fig. 3 but with the heater removed from association with the bracket; and Fig. 6 is a horizontal section on the line 6—6 of Fig. 5.

The automobile illustrated in Fig. 1 is of a type common today and embodies a pair of fresh-air conduits 10 which extend from points near the front of the automobile rearwardly through the dash 11, where they may be provided with outlet fittings 12. Each conduit is provided with a butterfly valve 13 and a valve-control 14 by means of which flow through the conduits may be regulated.

In order to provide for the possibility of heating fresh air admitted to the automobile body, the rear end of one of the conduits 10 is formed by the run of a T-fitting having a lateral adapted to be connected through an elbow 15 with the inlet of an automobile-body heater 16 mounted on the inner face of the dash 11. Commonly, the lateral outlet of the T is so positioned relative to the associated valve 13, and such valve is so constructed, that it can be adjusted either to prevent flow entirely through the conduit 10, to direct air flowing through such conduit to the lateral outlet, or to permit the air flowing through the conduit to continue on rearwardly to be discharged through the fitting 12.

The construction described permits the automobile to be sold either with or without a heater, and also facilitates the later application of a heater if one is desired. When the automobile is sold without a heater, the lateral outlet of the T is capped, so that both conduits 10 serve merely for the admission of fresh air when desired. If a heater is to be provided, the cap is removed, the heater 16 is mounted on the dash 11, and the elbow 15 installed to connect the heater-inlet with the fresh-air conduit.

To adapt an automobile of the type shown in Fig. 1 for installation of a more or less conventional form of recirculating automobile heater and to make it possible for that heater to be employed either in its normal function of recirculating and heating air within the automobile body or as a means to heat air admitted through the conduit 10, I may employ the construction illustrated in Figs. 2 to 6 inclusive. Such a construction embodies a mounting bracket having a vertical leg 20 adapted to be secured to the automobile dash 11 and a horizontal leg 21 which projects from the lower end of the vertical leg 20. The vertical leg 20 is provided along its side edges and on its top with a flange 22, and the lower leg is provided along its side edges and its outer edge with a flange 23, which flanges 22 and 23 make the legs of channel-like cross-section. Conveniently, the two legs are formed as sheet-metal stampings nested together at their point of junction and secured to each other as by spot welding.

The heater 16 comprises a casing having a back wall 25, end walls 26, and top and front walls 27 and 28. The lower edges of the end and front walls are turned inwardly to define an air-admission opening overlaid by a heat-exchanging core 29. An electric motor 30 supported within the casing from the back wall drives a pair of fans 31 which, in operation, draw air upwardly through the core 29 and discharge it through openings in the end walls 26, such openings having associated with them adjustable closures or deflectors 26'. At one end, the core 29 is provided with fittings 34 adapting it for connection to the cooling system of the automobile engine 35. In the particular heater shown, each of the fans 31 is surrounded with a shroud 32 provided with a tangential outlet communicating with nipples 33 adapted for connection to defroster conduits.

The particular heater shown in the drawings is of a type more fully illustrated and described in the co-pending application of Ralph C. Root and myself, Serial No. 67,953, filed December 29, 1948, and now abandoned; but it is to be understood that my invention is not limited to the use of that particular heater, as any heater having an inlet opening in its bottom wall may be used.

When mounted on the bracket 20—21, the heater covers the open front face of the vertical bracket-leg 20 and the upper face of the lower bracket-leg 21, as will be clear from Fig. 2, thus cooperating with the bracket to define an L-shaped air passage communicating with the air-admission opening in the bottom of the heater. To reduce the escape of air from such passage, the edges of the flanges 22 and 23 may be embraced by a U-shaped strip 37 of some resilient material, such as soft rubber. At intervals along the side of the vertical leg 20, the resilient strip 37 is notched to permit the passage through it of ears 38 which are integral with the flange 22 and which extend for a short distance along the inner faces of end walls 26 of the heater casing through notches in the back wall 25 thereof. Screws 39 passing through openings in the end walls 26 and ears 38 serve to hold the heater in place on the bracket 20—21.

The bottom leg 21 of the bracket and damper plate 40 slidably associated with it are provided with a series of air-admitting openings 41 which can be moved either into or out of alignment by sliding movement of the damper plate. Conveniently, the damper plate is provided with a pair of spaced posts 42 which extend downwardly through slots 43 in the leg 21 and are provided at their lower ends with heads 44 bearing against the lower surface of such leg. The posts also extend upwardly and are provided with aligned openings for the reception of a Bowden wire 45 secured to the posts as by set screws 46. Below the wire 45, each of the posts 42 is surrounded by a washer 47 and, below such washer, by a compression spring 48 which, by acting through the post 42, urges the post-heads 44 upwardly into frictional engagement with the lower surface of the leg 21 to reduce noise and to hold the damper plate 40 yieldably in any position of adjustment. The Bowden wire 45 and its associated sheath 50, which is anchored to the flange 23 at one side of the leg 21, extend to some convenient point, preferably on the instrument panel 51, where the wire is provided with a control button 52 by which it can be moved to close the openings 41.

The vertical leg 20 of the bracket is provided with an opening 55 for the admission of air from the elbow 15, and is desirably also provided with openings 56 for the reception of bolts 57 by which the bracket is secured to the dash 11. By providing a number of the holes 56, the bracket can be adapted for ready mounting in different automobiles which are provided by the manufacturer with definitely located holes or knock-outs for the reception of heater-mounting bolts. Additional flexibility of installation may be obtained by providing the vertical bracket-leg 20 with two pairs of openings 56' for receiving the fittings 34 and by employing a heater in which the core may be reversed to dispose the fittings 34 at either side of the heater.

In mounting the bracket on the automobile-dash 11, a suitable air-passing hole is provided in the automobile dash if no such hole is already present therein. The bracket is then placed against the inner face of the dash with its opening 55 aligned with the air-passing opening in the dash, and the bracket is secured in position by bolts 57. Conveniently, the same bolts 57 which are employed to secure the bracket to the dash are also employed to mount a flanged nipple 58 which extends into and communicates with the outlet of the elbow 15. After the bracket and nipple 58 have been firmly secured to the dash, the heater is put in place on the bracket and secured thereto by the screws 39.

With the heater installed as above described, it may be employed either to recirculate and heat the air within the automobile body or, alternatively, to heat air admitted to the automobile body from outside through the conduit 10. If the heater is to be used as a recirculating heater, the valve 13 in the conduit 10 is adjusted to prevent any air flow through the conduit to the outlet fitting 12 or elbow 15, and the Bowden wire 45 and the Bowden-wire control 52 are adjusted to open the shutter 40 in the bottom wall of the bracket. If the heater is operated in this condition, the fans 31 draw air upwardly and inwardly through the openings 41 and through the core 29, such air being discharged from the heater casing under the control of the doors or deflectors 26'. If it is desired to employ the heater to heat air admitted from outside the automobile body, the Bowden-wire control 52 is adjusted to move the shutter 40 and close the openings 41, and the valve 13 is adjusted to admit air from the conduit 10 to the elbow 15. In this condition, operation of the motor 30 will cause the fans 31 to draw air inwardly through the conduit 10, elbow 15, the channel defined between the heater and the bracket, and the core 29, the heated air being discharged as before from the heater casing under control of the doors or deflectors 26'. At high automobile speeds, it is possible to obtain a considerable circulation of air through the conduit 10, elbow 15, and core 29 without the necessity of operating the fans.

I claim as my invention:

1. In combination with an automobile-body heater having a casing provided with an air inlet opening in its bottom and with an air outlet opening, means within the casing for drawing air through the air inlet and discharging it through the air outlet opening, and a heat-exchanging core in heat-exchanging relationship with air flowing through the casing, a mounting bracket for said heater, said bracket having a vertical rear wall and a horizontal bottom wall projecting forwardly from the rear wall, said walls being provided with flanges engageable with the heater casing at rear and bottom whereby the heater casing and bracket co-operate to define an L-shaped passage communicating with the inlet opening of the heater casing, each wall of said bracket being provided with an air inlet opening, an adjustable closure associated with the opening in the bottom bracket-wall, and releasable means for holding the heater in place on the bracket.

2. In combination, an automobile body heater and a supporting bracket therefor, said heater having a casing, said bracket having a vertical rear wall adapted to be secured to the dash of an automobile body and provided with flanges engageable with the heater at the rear thereof, said bracket having a second wall projecting outwardly from and generally perpendicular to the rear wall and also provided with flanges engageable with the heater casing, whereby the two bracket-walls, their flanges, and the heater casing will define a generally L-shaped air passage, the rear bracket-wall having an opening for admitting air to said passage, said heater casing having an air-inlet opening communicating with said passage opposite said second bracket-wall, the second bracket-wall being provided with an opening for the admission of air from the automobile body, an adjustable closure for the last-named opening, means for drawing air into the heater through said air-inlet opening and discharging it to the automobile body, a heat-exchanging core within said casing in heat-exchanging relationship with air passing therethrough, and releasable means for holding the heater in place on the bracket.

3. The invention set forth in claim 2 with the addition that said core has horizontally projecting fittings adapting it for connection in a liquid-circulating system, the rear bracket wall being provided with openings receiving said fittings.

4. A bracket for use in mounting on a vertical wall of an automobile body an air circulating heater having an air inlet in its bottom, said bracket having vertical and bottom walls, a flange extending around the periphery of the bracket and projecting inwardly thereof, the edges of those portions of said flange extending from the vertical bracket-wall being presented forwardly for engagement with the rear of the heater and the edges of those portions of said flange projecting from the bottom bracket-wall being presented upwardly for engagement with the bottom of the heater and embracing said air inlet opening, air admitting openings in said vertical and bottom walls, and an adjustable closure associated with the openings in the bottom wall.

5. A bracket as set forth in claim 4 with the addition that said flange is provided at its edge with a member of resilient material for engagement with the heater.

6. The invention set forth in claim 4 with the addition that said closure is a slidable shutter having openings which, by sliding movement of the shutter, can be brought either into or out of registry with the openings in the bottom wall, slots in said bottom wall, posts carried by said shutter and projecting through said slots, said posts being provided with heads engaging the lower face of the bottom wall, a Bowden wire extending through and secured to said posts above the shutter, and compression springs respectively surrounding said posts and acting between the Bowden wire and shutter to force the latter downwardly into frictional engagement with the bottom wall.

7. The invention set forth in claim 4 with the addition that said closure is a slidable shutter having openings which, by sliding movement of the shutter, can be brought either into or out of registry with the openings in the bottom wall, a slot in the bottom wall, a post carried by said shutter, extending through said slot, and provided with a head engaging the lower face of the bottom wall, a Bowden wire extending through and secured to said post above the shutter and a compression spring surrounding said post and acting between the Bowden wire and shutter to force the latter downwardly into frictional engagement with the bottom wall.

EARL C. BOOTH.

REFERENCES CITED

The following references are of record in the file of this patent:

UNITED STATES PATENTS

| Number | Name | Date |
| --- | --- | --- |
| 765,423 | Glantzberg | July 19, 1904 |
| 1,797,293 | McIlvaine | Mar. 24, 1931 |
| 1,958,225 | Askin | May 8, 1934 |
| 1,977,248 | Space | Oct. 16, 1934 |
| 2,112,221 | Sargent et al. | Mar. 22, 1938 |
| 2,204,401 | Butler | June 11, 1940 |
| 2,209,800 | Terry | July 30, 1940 |
| 2,237,477 | Colvin | Apr. 8, 1941 |
| 2,238,585 | Findley | Apr. 15, 1941 |
| 2,322,904 | Williams | June 29, 1943 |
| 2,488,278 | Findley | Nov. 15, 1949 |